(12) United States Patent
Ma et al.

(10) Patent No.: US 9,485,465 B2
(45) Date of Patent: Nov. 1, 2016

(54) PICTURE CONTROL METHOD, TERMINAL, AND VIDEO CONFERENCING APPARATUS

(71) Applicant: Huawei Technologies Co., Ltd., Shenzhen (CN)

(72) Inventors: Weijun Ma, Shenzhen (CN); Yun Hu, Brussels (BE); Shengyu Liu, Shenzhen (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 14/754,197

(22) Filed: Jun. 29, 2015

(65) Prior Publication Data

US 2015/0304609 A1     Oct. 22, 2015

Related U.S. Application Data

(63) Continuation of application No. PCT/CN2013/081259, filed on Aug. 12, 2013.

(30) Foreign Application Priority Data

Dec. 28, 2012   (CN) .......................... 2012 1 0586124

(51) Int. Cl.
*H04N 7/15* (2006.01)
*H04N 7/14* (2006.01)
(52) U.S. Cl.
CPC ................ *H04N 7/15* (2013.01); *H04N 7/147* (2013.01); *H04N 7/152* (2013.01)
(58) Field of Classification Search
CPC ........ H04N 7/15; H04N 7/147; H04N 7/152; H04N 7/14

USPC .......................................... 348/14.01–14.16
See application file for complete search history.

(56) References Cited

U.S. PATENT DOCUMENTS

| | | | |
|---|---|---|---|
| 8,941,708 B2 * | 1/2015 | Skramstad | H04N 5/265 348/14.01 |
| 2006/0215765 A1 | 9/2006 | Hwang et al. | |
| 2007/0299981 A1 * | 12/2007 | Baird | G06Q 10/10 709/231 |
| 2010/0333004 A1 * | 12/2010 | Kristiansen | G06F 3/04883 715/765 |

FOREIGN PATENT DOCUMENTS

| | | |
|---|---|---|
| CN | 2805011 Y | 8/2006 |
| CN | 101291398 A | 10/2008 |
| CN | 102215375 A | 10/2011 |
| CN | 102457702 A | 5/2012 |
| CN | 103051865 A | 4/2013 |

* cited by examiner

*Primary Examiner* — Melur Ramakrishnaiah
(74) *Attorney, Agent, or Firm* — Slater Matsil, LLP

(57) ABSTRACT

The present invention provides a picture control method, a terminal, and a video conferencing apparatus. The method includes, when videos separately corresponding to more than one terminal in a video conference are separately displayed on a multipicture of a first terminal, receiving, by the first terminal, a first instruction that is used to replace a video source of a subpicture in the multipicture. The first instruction includes relative position information of at least one subpicture and indication information that is used to indicate a new video source of the at least one subpicture. The method further includes sending a request message including the first instruction to a video conferencing apparatus receiving a video stream that is corresponding to the new video source and sent by the video conferencing apparatus, and displaying the new video source on a subpicture corresponding to the new video source.

17 Claims, 10 Drawing Sheets

```
┌─────────────────────────────────────────────────────────────────────┐
│ When videos separately corresponding to more than one terminal in a │
│ video conference are separately displayed on a multipicture of a    │
│ first terminal, the first terminal receives a first instruction that│ 301
│ is used to replace a video source of at least one subpicture in the │
│ multipicture, where the first instruction includes: relative        │
│ position information of the at least one subpicture and indication  │
│ information that is used to indicate a new video source of the at   │
│ least one subpicture, where the new video source is preconfigured   │
└─────────────────────────────────────────────────────────────────────┘
                                   │
                                   ▼
┌─────────────────────────────────────────────────────────────────────┐
│ The first terminal sends a request message including the first      │
│ instruction to a video conferencing apparatus, so that the video    │
│ conferencing apparatus uses the new video source to replace a       │ 302
│ current video source of the at least one subpicture, where the at   │
│ least one subpicture is the at least one subpicture corresponding   │
│ to the relative position information                                │
└─────────────────────────────────────────────────────────────────────┘
                                   │
                                   ▼
┌─────────────────────────────────────────────────────────────────────┐
│ The first terminal receives a video stream that is corresponding to │
│ the new video source and sent by the video conferencing apparatus,  │ 303
│ and displays the new video source on a subpicture corresponding to  │
│ the new video source                                                │
└─────────────────────────────────────────────────────────────────────┘
```

FIG. 3A

401 — When videos separately corresponding to more than one terminal in a video conference are separately displayed on a multipicture of a first terminal, the first terminal receives information that is of the multipicture and sent by the video conference apparatus, where the information of the multipicture includes: an identifier of a subpicture, an arrangement position, in the multipicture, of the subpicture corresponding to the identifier, and a relative size of the subpicture corresponding to the identifier 402 — The first terminal receives a first instruction that is used to replace a video source of at least one subpicture in the multipicture, where the first instruction includes: relative position information of the at least one subpicture and indication information that is used to indicate a new video source of the at least one subpicture 403 — The first terminal determines a coordinate value range of each subpicture in the multipicture according to the arranGement position and the relative size; and determines, according to the relative position information, a coordinate value range, to which the relative position information belongs, of a subpicture corresponding to an identifier, to obtain an identifier of the at least one subpicture 404 — The first terminal sends a request message including the identifier of the at least one subpicture and the indication information to the video conferencing apparatus, so that the video conferencing apparatus uses the new video source to replace a current video source of the at least one subpicture, where the at least one subpicture is the at least one subpicture corresponding to the relative position information 405 — The first terminal receives a video stream that is corresponding to the new video source and sent by the video conferencing apparatus, and displays the new video source on a subpicture corresponding to the new video source

FIG. 4A

A video conferencing apparatus receives a request message that includes a first instruction and is sent by a first terminal, where when videos separately corresponding to more than one terminal in a video conference are separately displayed on a multipicture of the first terminal, the request message is sent after the first terminal receives the first instruction that is used to replace a video source of at least one subpicture in the multipicture, and the first instruction includes: relative position information of the at least one subpicture and indication information that is used to indicate a new video source of the at least one subpicture  — 501

The video conferencing apparatus uses the new video source to replace a current video source of the at least one subpicture, where the at least one subpicture is the at least one subpicture corresponding to the relative position information  — 502

The video conferencing apparatus sends a video stream corresponding to the new video source to the first terminal, so that the first terminal displays the new video source on a subpicture corresponding to the new video source  — 503

FIG. 5

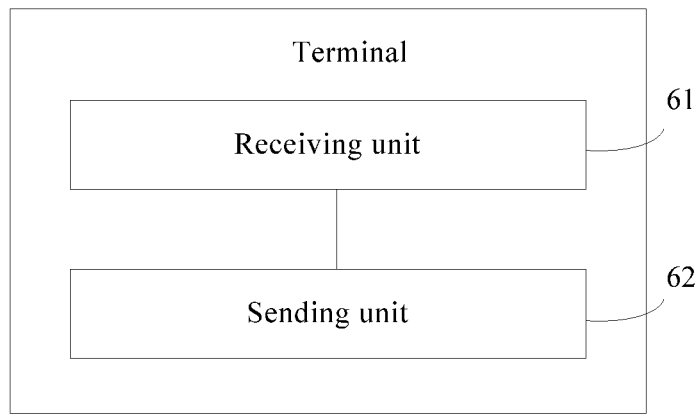

PICTURE CONTROL METHOD, TERMINAL, AND VIDEO CONFERENCING APPARATUS

CROSS-REFERENCE TO RELATED APPLICATIONS

This application is a continuation of International Application No. PCT/CN2013/081259, filed on Aug. 12, 2013, which claims priority to Chinese Patent Application No. 201210586124.3, filed on Dec. 28, 2012, both of which are hereby incorporated by reference in their entireties.

TECHNICAL FIELD

Embodiments of the present invention relate to communications technologies, and in particular, to a picture control method, a terminal, and a video conferencing apparatus.

BACKGROUND

Multipicture is a basic function of a video conference service and refers to that a participant can watch, in a video conference, video pictures of multiple participants on a terminal. As shown in FIG. 1, terminals A, B, C, and D are in a same video conference, and the terminal D may watch, on its own side, a scenario of multiple video pictures including videos sent by the terminals A, B, and C.

The multipicture has multiple layout forms, but generally includes a relatively large subpicture (such as, a subpicture 1 in FIG. 1) and multiple relatively small subpictures (such as, subpictures 2 and 3 in FIG. 1).

A video source (that is, a terminal whose video is displayed on a subpicture, in a video conferencing apparatus) corresponding to each subpicture may be set. As shown in FIG. 1, video sources corresponding to subpictures 1, 2, and 3 in multipicture on the terminal D are the terminals A, B, and C respectively. In a conference, the terminal D may modify a video source of a subpicture.

A current video conferencing apparatus includes a conference application server ("AS") and a multipoint control unit ("MCU"). In a video conferencing apparatus in which multipicture are synthesized by an MCU, as shown in FIG. 2, the MCU synthesizes, under control of a conference AS, multiple video streams according to a multipicture form set by a terminal and then sends a synthesized video stream to the terminal. The terminal receives only one synthesized video stream, and therefore, the terminal cannot perceive information of the multipicture (such as, the number of subpictures, and an arrangement position and a relative size of each subpicture).

When a terminal modifies a video source corresponding to each subpicture, the terminal can modify/set the video source corresponding to the subpicture only by using a conference management interface provided by the video conferencing apparatus. For example, the terminal D accesses a conference management platform of the video conferencing apparatus by using a web browser, and enters a login account/password or a conference identity (Identity, ID for short)/conference password. After authentication is successful, the terminal D is connected to the conference management platform, and further opens a multipicture control interface to view current multipicture. In this case, on the multipicture control interface, the terminal D may select a subpicture 1 and set the terminal B as a video source; select a subpicture 2 and set the terminal A as a video source; and submit the operations, so that the video conferencing apparatus executes an operation request. An MCU of the video conferencing apparatus synthesizes multipicture according to a specified multipicture form and sends a synthesized picture to the terminal D, so that the terminal D displays modified multipicture.

The foregoing manner of modifying video sources of multipicture requires a complex operation and has poor usability.

SUMMARY

In view of this, embodiments of the present invention provide a picture control method, a terminal, and a video conferencing apparatus, to solve a problem in the prior art that a manner of modifying a video source of a multipicture requires a complex operation and has poor usability.

According to a first aspect, a picture control method is provided, including, when videos separately corresponding to more than one terminal in a video conference are separately displayed on a multipicture of a first terminal, receiving, by the first terminal, a first instruction that is used to replace a video source of at least one subpicture in the multipicture, where the first instruction includes relative position information of the at least one subpicture and indication information that is used to indicate a new video source of the at least one subpicture, sending a request message including the first instruction to a video conferencing apparatus, so that the video conferencing apparatus uses the new video source to replace a current video source of the at least one subpicture, where the at least one subpicture is the at least one subpicture corresponding to the relative position information, and receiving a video stream that is corresponding to the new video source and sent by the video conferencing apparatus, and displaying the new video source on a subpicture corresponding to the new video source.

With reference to the first aspect, in a first possible implementation manner, that the video conferencing apparatus uses the new video source to replace a current video source of the at least one subpicture, where the at least one subpicture is at least one subpicture corresponding to the relative position information, includes determining, by the video conferencing apparatus, an identifier of the at least one subpicture according to pre-stored information of the multipicture on the first terminal and the relative position information of the at least one subpicture, and using the new video source to replace a current video source of a subpicture corresponding to the identifier.

With reference to the first aspect and the foregoing possible implementation manner, in a second possible implementation manner, the receiving, by the first terminal, a first instruction that is used to replace a video source of at least one subpicture in the multipicture is specifically, when an operation type corresponding to the multipicture is preset in the first terminal, if the first terminal receives information, which is transmitted by a user interface, of the operation type corresponding to the multipicture, obtaining, by the first terminal, the indication information in the first instruction, and after obtaining the indication information, capturing, by the first terminal, relative position information of a focus that is corresponding to an external device and in the multipicture, where the relative position information of the corresponding focus is the relative position information of the at least one subpicture.

According to a second aspect, a picture control method is provided, including receiving, by a video conferencing apparatus, a request message that includes a first instruction and is sent by a first terminal, where, when videos separately corresponding to more than one terminal in a video conference are separately displayed on a multipicture of the first terminal, the request message is sent after the first terminal receives the first instruction that is used to replace a video source of at least one subpicture in the multipicture, and the first instruction includes relative position information of the at least one subpicture and indication information that is used to indicate a new video source of the at least one subpicture, using the new video source to replace a current video source of the at least one subpicture, where the at least one subpicture is the at least one subpicture corresponding to the relative position information, and sending a video stream corresponding to the new video source to the first terminal, so that the first terminal displays the new video source on a subpicture corresponding to the new video source.

With reference to the second aspect, in a first possible implementation manner, before the step of receiving, by a video conferencing apparatus, a request message that includes a first instruction and is sent by a first terminal, the method further includes sending, by the video conferencing apparatus, information of the multipicture to the first terminal, where the information of the multipicture includes identifiers of all subpictures in the multipicture, arrangement positions, in the multipicture, of the subpictures corresponding to the identifiers, and relative sizes of the subpictures corresponding to the identifiers.

According to a third aspect, a terminal is provided, where videos separately corresponding to more than one terminal in a video conference are separately displayed on a multipicture of the terminal, and the terminal includes a receiving unit, configured to receive a first instruction that is used to replace a video source of at least one subpicture in the multipicture, where the first instruction includes relative position information of the at least one subpicture and indication information that is used to indicate a new video source of the at least one subpicture, and a sending unit, configured to, after the receiving unit receives the first instruction, send a request message including the first instruction to a video conferencing apparatus, so that the video conferencing apparatus uses the new video source to replace a current video source of the at least one subpicture, where the at least one subpicture is the at least one subpicture corresponding to the relative position information, where the receiving unit is further configured to, after the sending unit sends the request message, receive a video stream that is corresponding to the new video source and sent by the video conferencing apparatus, and display the new video source on a subpicture corresponding to the new video source.

With reference to the third aspect, in a first possible implementation manner, the sending unit is specifically configured to, after the receiving unit receives the first instruction, send the request message including the first instruction to the video conferencing apparatus, so that the video conferencing apparatus determines an identifier of the at least one subpicture according to pre-stored information of the multipicture on the first terminal and the relative position information of the at least one subpicture, and uses the new video source to replace a current video source of a subpicture corresponding to the identifier.

According to a fourth aspect, a video conferencing apparatus is provided, including a receiving unit, configured to receive a request message that includes a first instruction and is sent by a first terminal, where when videos separately corresponding to more than one terminal in a video conference are separately displayed on a multipicture of the first terminal, the request message is sent after the first terminal receives the first instruction that is used to replace a video source of at least one subpicture in the multipicture, and the first instruction includes relative position information of the at least one subpicture and indication information that is used to indicate a new video source of the at least one subpicture; a replacing unit, configured to: after the receiving unit receives the request message, use the new video source to replace a current video source of the at least one subpicture, where the at least one subpicture is the at least one subpicture corresponding to the relative position information, and a sending unit, configured to, after the replacing unit uses the new video source for replacement, send a video stream corresponding to the new video source to the first terminal, so that the first terminal displays the new video source on a subpicture corresponding to the new video source.

According to a fifth aspect, a conference system is provided, including a terminal and a video conferencing apparatus, where when videos separately corresponding to more than one terminal in a video conference are separately displayed on a multipicture of the terminal, the terminal receives a first instruction that is used to replace a video source of at least one subpicture in the multipicture, where the first instruction includes relative position information of the at least one subpicture and indication information that is used to indicate a new video source of the at least one subpicture, the terminal sends a request message including the first instruction to the video conferencing apparatus, after receiving the request message, the video conferencing apparatus uses the new video source to replace a current video source of the at least one subpicture, where the at least one subpicture is the at least one subpicture corresponding to the relative position information, and sends a video stream corresponding to the new video source to the terminal, and after receiving the video stream that is corresponding to the new video source and sent by the video conferencing apparatus, the terminal displays the new video source on a subpicture corresponding to the new video source.

According to a sixth aspect, a picture control method is provided, including, when videos separately corresponding to more than one terminal in a video conference are separately displayed on a multipicture of a first terminal, receiving, by the first terminal, a first instruction that is used to replace a video source of at least one subpicture in the multipicture, where the first instruction includes relative position information of the at least one subpicture and indication information that is used to indicate a new video source of the at least one subpicture, sending a request message including an identifier of the at least one subpicture and the indication information to a video conferencing apparatus, so that the video conferencing apparatus uses the new video source to replace a current video source of the at least one subpicture, where the at least one subpicture is a subpicture corresponding to the identifier of the at least one subpicture, and receiving a video stream that is corresponding to the new video source and sent by the video conferencing apparatus, and displaying the new video source on a subpicture corresponding to the new video source.

According to a seventh aspect, a terminal is provided, where videos separately corresponding to more than one terminal in a video conference are separately displayed on a multipicture of the terminal, and the terminal includes: a receiving unit, configured to receive a first instruction that is used to replace a video source of at least one subpicture in the multipicture, where the first instruction includes relative position information of the at least one subpicture and indication information that is used to indicate a new video source of the at least one subpicture, where the new video source is preconfigured, and a sending unit, configured to, after the receiving unit receives the first instruction, send a request message including an identifier of the at least one subpicture and the indication information to a video conferencing apparatus, so that the video conferencing apparatus uses the new video source to replace a current video source of the at least one subpicture, where the at least one subpicture is a subpicture corresponding to the identifier of the at least one subpicture, where the receiving unit is further configured to, after the sending unit sends the request message, receive a video stream that is corresponding to the new video source and sent by the video conferencing apparatus, and display the new video source on a subpicture corresponding to the new video source.

According to an eighth aspect, a video conferencing apparatus is provided, including a receiving unit, configured to receive a request message sent by a first terminal, where, when videos separately corresponding to more than one terminal in a video conference are separately displayed on a multipicture of the first terminal, the request message is sent after the first terminal receives a first instruction that is used to replace a video source of at least one subpicture in the multipicture, and the request message includes an identifier of the at least one subpicture and indication information that is used to indicate a new video source of the at least one subpicture, a replacing unit, configured to, after the receiving unit receives the request message, use the new video source to replace a current video source of the at least one subpicture, where the at least one subpicture is the at least one subpicture corresponding to the identifier of the at least one subpicture, and a sending unit, configured to, after the replacing unit uses the new video source for replacement, send a video stream corresponding to the new video source to the first terminal, so that the first terminal displays the new video source on a subpicture corresponding to the new video source.

It may be known from the foregoing technical solutions that, according to the picture control method, terminal, and video conferencing apparatus in the embodiments of the present invention, the first terminal receives the first instruction that is used to replace the video source of the at least one subpicture in the multipicture, and further sends the request message including the first instruction to the video conferencing apparatus, so that the video conferencing apparatus uses the new video source to replace the current video source of the at least one subpicture, where the at least one subpicture is at least one subpicture corresponding to the relative position information, and further, the terminal receives the video stream corresponding to the new video source and sent by the video conferencing apparatus, and displays the new video source on the subpicture corresponding to the new video source. This can solve a problem in the prior art that a manner of modifying a video source of a multipicture requires a complex operation and has poor usability.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 3A is a schematic flowchart of a picture control method according to an embodiment of the present invention;

FIG. 4A is a schematic flowchart of a picture control method according to an embodiment of the present invention;

FIG. 5 is a schematic flowchart of a picture control method according to an embodiment of the present invention;

FIG. 6 is a schematic structural diagram of a terminal according to an embodiment of the present invention;

DETAILED DESCRIPTION OF ILLUSTRATIVE EMBODIMENTS

To make the objectives, technical solutions, and advantages of the present invention clearer, the following clearly describes the technical solutions of the present invention with reference to the accompanying drawings in the embodiments of the present invention. Apparently, the following described embodiments are a part of the embodiments of the present invention. Based on the embodiments of the present invention, persons of ordinary skill in the art can obtain other embodiments that can solve the technical problem of the present invention and implement the technical effect of the present invention by equivalently altering some or all the technical features even without creative efforts. Apparently, the embodiments obtained by means of alteration do not depart from the scope disclosed in the present invention.

For ease of description, in the following, in some places, a relatively large subpicture in a multipicture displayed on a terminal is referred to as a primary picture and a relatively small subpicture in the multipicture is referred to as a secondary picture.

FIG. 3A is a schematic flowchart of a picture control method according to an embodiment of the present invention. As shown in FIG. 3A, the picture control method in this embodiment is described in the following steps.

301: When videos separately corresponding to more than one terminal in a video conference are separately displayed on a multipicture of a first terminal, the first terminal receives a first instruction that is used to replace a video source of at least one subpicture in the multipicture, where the first instruction includes relative position information of the at least one subpicture and indication information that is used to indicate a new video source of the at least one subpicture, where the new video source is preconfigured.

For example, the videos separately corresponding to the more than one terminal in the video conference are displayed in the multipicture on the first terminal, and the more than one terminal may include the first terminal. That is, the first terminal in the video conference may further display a video of the first terminal.

In this embodiment, only relative position information of at least one subpicture whose video source is to be replaced can be acquired on the first terminal. For example, a subpicture whose video source is replaced is located in the upper left corner of the multipicture, or a subpicture whose video source is replaced is located in the lower right corner of the multipicture. However, the first terminal cannot learn which subpicture in the multipicture is specifically the subpicture whose video source is replaced, or information such as an arrangement position of the subpicture.

Figure 1:
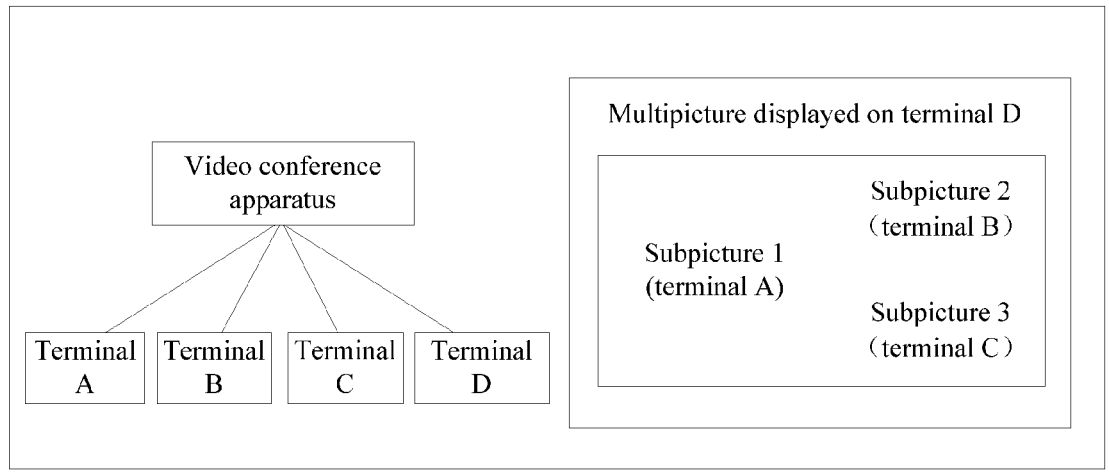
FIG. 1 is a scenario diagram of multipicture in a current video conferencing apparatus.
Figure 2:
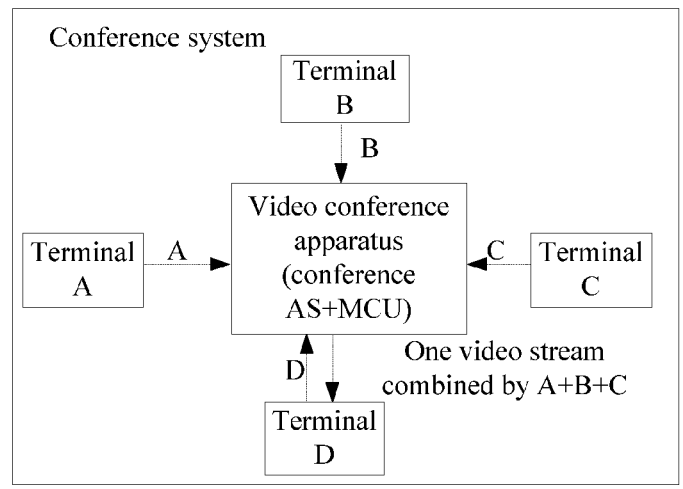
FIG. 2 is a schematic diagram of forming multipicture in a current video conferencing apparatus.

In addition, in this embodiment, a whole picture including multiple subpictures displayed on the first terminal is called the multipicture. With reference to FIG. 1, a multipicture displayed on a terminal D on the right side of FIG. 1 includes a subpicture 1, a subpicture 2, and a subpicture 3, and a video source corresponding to the subpicture 1 is a terminal A, a video source corresponding to the subpicture 2 is a terminal B, a video source corresponding to the subpicture 3 is a terminal C, and the like.

302: The first terminal sends a request message including the first instruction to a video conferencing apparatus, so that the video conferencing apparatus uses the new video source to replace a current video source of the at least one subpicture, where the at least one subpicture is the at least one subpicture corresponding to the relative position information.

In a possible application scenario, step 302 may specifically include the following steps. The first terminal sends a request message including the first instruction to a video conferencing apparatus, so that the video conferencing apparatus determines an identifier of the at least one subpicture according to pre-stored information of the multipicture on the first terminal and the relative position information of the at least one subpicture, and uses the new video source to replace a current video source of a subpicture corresponding to the identifier.

For example, a subpicture identifier may be a number of a subpicture, for example, a subpicture 1 and a subpicture 2.

It should be understood that, in this embodiment, only the multipicture is displayed on the first terminal, but the terminal cannot learn the information of the multipicture. For example, the information of the multipicture may include an identifier of a subpicture, an arrangement position, in the multipicture, of the subpicture corresponding to the identifier, a relative size of the subpicture corresponding to the identifier, and the like.

In another embodiment, the information of the multipicture may include the number of subpictures, an identifier of a subpicture, an arrangement position, in the multipicture, of the subpicture corresponding to the identifier, a relative size of the subpicture corresponding to the identifier, a current video source of the subpicture corresponding to the identifier, and the like.

It should be noted that an arrangement position, in the multipicture, of a subpicture may be a relative arrangement position, in the multipicture, of the subpicture. To differentiate from the relative position in the foregoing step 301, an arrangement position is used for description in this embodiment.

303: The first terminal receives a video stream that is corresponding to the new video source and sent by the video conferencing apparatus, and displays the new video source on a subpicture corresponding to the new video source.

Optionally, in another embodiment, the first terminal may further receive an operation success response sent by the video conferencing apparatus.

For example, in an optional implementation scenario, that "the first terminal receives a first instruction that is used to replace a video source of at least one subpicture in the multipicture" in the foregoing step 301 may be specifically represented as follows: when an operation type (for example, a touch sliding operation for switching a video source of a subpicture, a shortcut key operation/menu operation for adding a new subpicture, or a double-clicking operation for replacing a video source of a subpicture in a multipicture) corresponding to the multipicture is preset in the first terminal, if the first terminal receives information/a response, which is transmitted by a user interface, of the operation type corresponding to the multipicture, the first terminal obtains the indication information in the first instruction; and after obtaining the indication information, the first terminal captures relative position information of a focus that is corresponding to an external device and in the multipicture, where the relative position information of the corresponding focus is the relative position information of the at least one subpicture.

For example, a participant/user performs a double-clicking operation on the multipicture on the first terminal, and the first terminal may receive indication information that is transmitted by the user interface and configured for an operation type, corresponding to the multipicture, of replacing a video source of a subpicture. The indication information includes: indication information indicating that a video source corresponding to a current subpicture (and a current secondary picture) is replaced by a video source corresponding to a primary picture in the multipicture.

After obtaining the indication information, the first terminal captures relative position information of a focus that is corresponding to an external device (for example, a mouse) and in the subpicture, where the relative position information of the corresponding focus is the relative position information of the at least one subpicture. That is, relative position information of the current subpicture in the first instruction is obtained.

Particularly, in the foregoing example, the first terminal firstly acquires the indication information and then acquires the relative position information of the current subpicture. In another scenario, the first terminal may also firstly acquire the relative position information of the current subpicture and then acquire the indication information. A sequence herein is not limited in this embodiment and is set according to an actual need.

The foregoing operation type preset in the first terminal may further include dragging, clicking, and the like. The operation type is not limited in this embodiment and another operation type that can be implemented may be set.

It may be known from the foregoing embodiment that, according to the picture control method in this embodiment, the first terminal receives the first instruction that is used to replace the video source of the at least one subpicture in the multipicture, and further sends the request message including the first instruction to the video conferencing apparatus, so that the video conferencing apparatus uses the new video source to replace the current video source of the at least one subpicture, where the at least one subpicture is at least one subpicture corresponding to the relative position information. Further, the terminal receives the video stream that is corresponding to the new video source and sent by the video conferencing apparatus, and displays the new video source on the subpicture corresponding to the new video source. This can solve a problem in the prior art that a manner of modifying a video source of a multipicture requires a complex operation and has poor usability.

Figure 3B:
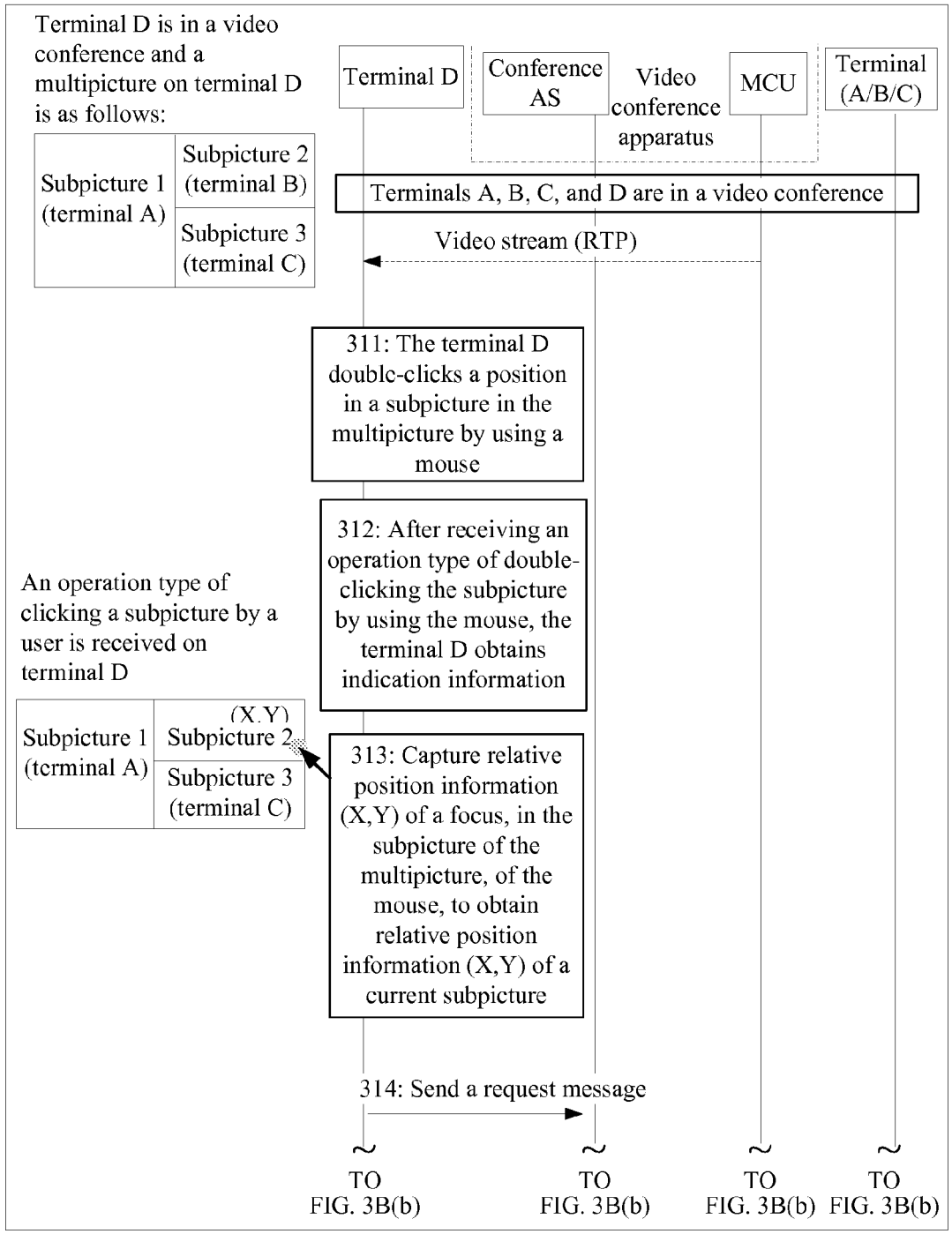
FIG. 3B(a) and FIG. 3B(b) are a schematic flowchart of a picture control method according to an embodiment of the present invention.
Figure 3B:
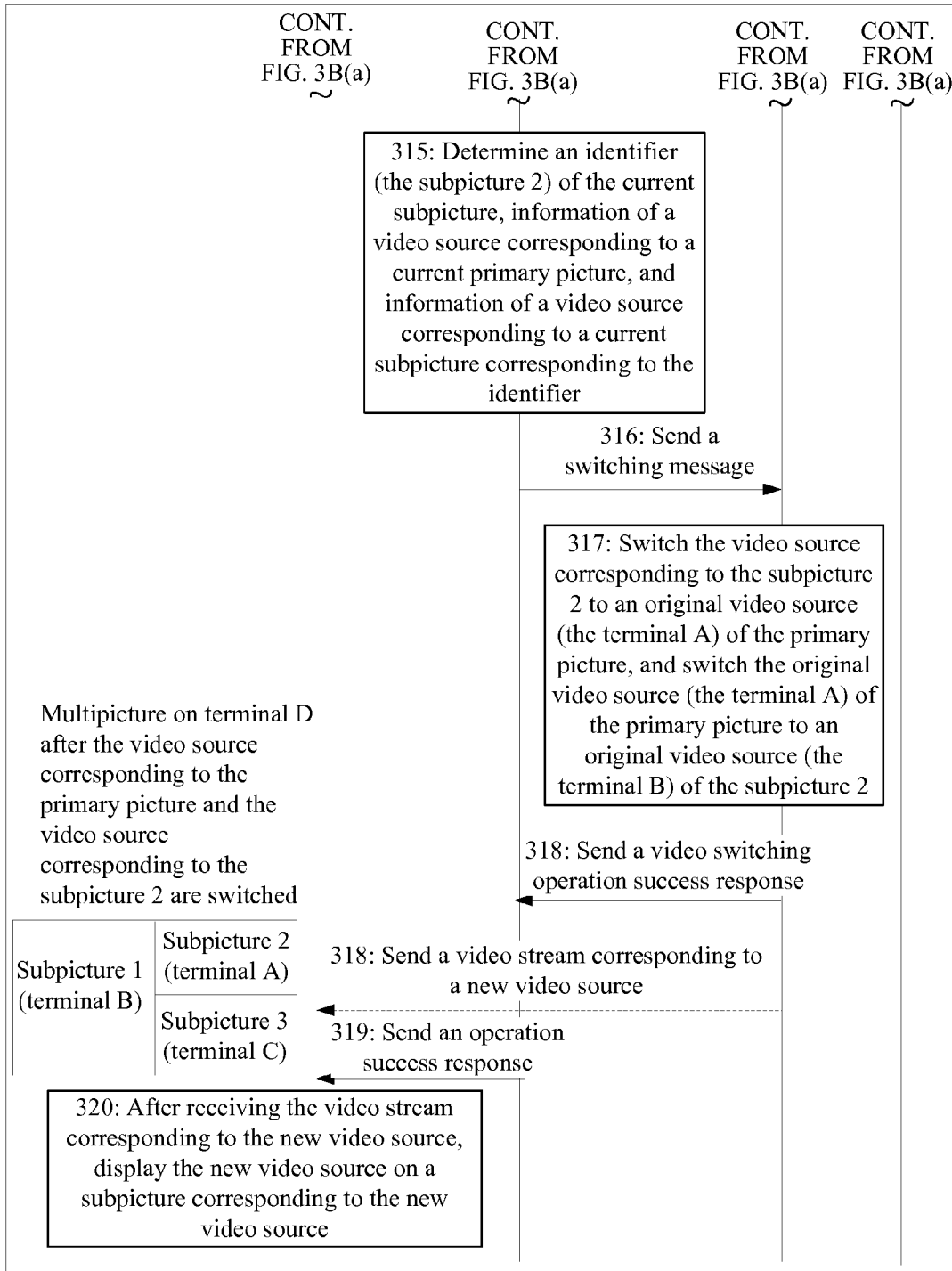

FIG. 3B(a) and FIG. 3B(b) are a schematic flowchart of a picture control method according to an embodiment of the present invention. As shown in FIG. 3B, the picture control method in this embodiment is described in the following steps.

Terminals A, B, C, and D are in a video conference. The terminal D watches, on a terminal side, videos sent by the terminals A, B, and C, where a video corresponding to the terminal A is a primary picture, and videos separately corresponding to the terminals B and C are secondary pictures.

311: The terminal D double-clicks a position in a subpicture of a multipicture by using a mouse.

312: The terminal D receives information, which is transmitted by a user interface, of an operation type of double-clicking a subpicture by an external device corresponding to the multipicture, and further obtains indication information, where the indication information includes: indication information indicating that a video source corresponding to a current subpicture is switched with a video source corresponding to a primary picture (namely, another subpicture) in the picture layout.

313: After obtaining the foregoing indication information, the terminal D captures relative position information (X, Y) of a focus (for example, a point where the mouse is located) that is corresponding to the external device and in the subpicture of the multipicture, where the relative position information of the corresponding focus is relative position information of the current subpicture. That is, the relative position information of the current subpicture is obtained.

Specifically, after the terminal D captures the double-clicking operation type of the external device (such as the mouse), the relative position information (X, Y), in a video window displaying the multipicture, of the focus of the mouse is shown in (X, Y) in the upper left corner of the left side of the figure.

In this embodiment, the double-clicking operation type indicates that the terminal D needs to switch a video source played in the subpicture to the primary picture for playing and the video source corresponding to the primary picture to the current subpicture for playing.

314: The terminal D sends a request message, such as, SIP (Session Initiation Protocol) INFO (INFO is a message type of SIP), to a conference AS of a video conferencing apparatus, where the request message includes: the indication information in step 312 and the relative position information (X, Y), which is acquired in step 313, of the current subpicture.

315: After receiving the request message, the conference AS of the video conferencing apparatus determines, according to the relative position information (X, Y) of the current subpicture whose video source is to be replaced and information, which is stored in the video conferencing apparatus, of the multipicture displayed on the terminal D, an identifier (a subpicture 2) of the subpicture whose video source is to be replaced, information of the video source corresponding to the current primary picture, and information of a video source corresponding to a current subpicture corresponding to the identifier.

That is, the conference AS processes the request message sent by the terminal D, and calculates an operated object according to the information of the current multipicture of the terminal D and the relative position information (X, Y) of the current subpicture, that is, determining a subpicture on which an operation is performed.

For example, according to the information (such as, an identifier of a subpicture, an arrangement position, in the multipicture, of the subpicture corresponding to the identifier, a relative size of the subpicture corresponding to the identifier, and a current video source of the subpicture corresponding to the identifier) of the current multipicture of the terminal D and the relative position information (X, Y) in the request message, the conference AS determines a subpicture where the focus of the mouse is located. The subpicture is the operated object that is, the subpicture 2 shown in FIG. 3B.

316: The conference AS sends a switching message to an MCU, where the switching message is used to instruct the MCU to switch the video source of the primary picture currently watched by the terminal D to a video source (the terminal B) played by an operated object (the subpicture 2) and switch the video source of the operated object (the subpicture 2) to the video source played in the primary picture.

317: After receiving the foregoing switching message, the MCU switches the video source corresponding to the operated object (the subpicture 2) to an original video source (the terminal A) of the primary picture and uses the original video source (the terminal A) of the primary picture to replace an original video source (the terminal B) of the operated object (the subpicture 2).

That is, the MCU of the video conferencing apparatus uses, according to the indication information, a new video source to replace the video source of the subpicture corresponding to the identifier.

318: The MCU returns a video switching operation success response of the switching message to the conference AS and sends a video stream corresponding to a new video source to the terminal D.

319: After receiving the video switching operation success response, the conference AS returns an operation success response to the terminal D.

320: The terminal D receives the operation success response sent by the conference AS, and receives the video stream corresponding to the new video source and displays the new video source on a subpicture corresponding to the new video source. For example, a video corresponding to the watched primary picture is the terminal B and a video corresponding to the subpicture 2 is the terminal A.

It should be understood that, when each terminal in a video conference may operate a video window in multipicture by means of double-clicking (or sliding, dragging, menu selection, or the like), the terminal determines an operation type and captures relative position information (X, Y) of a double-clicking focus, in the video window, of an external device, and then sends, to a conference AS, a request message carrying parameters such as the operation type and the relative position information of the operation focus of the external device; and further, after receiving the request message, the conference AS performs calculation according to the relative position information of the operation focus and information of a current multipicture on the terminal, determines an operated object (such as, a subpicture 2 in the figure), acquires a current video source (for example, a terminal B) of the operated object, and then sends a switching message to an MCU, so as to use a new video source to replace a video source of a subpicture corresponding to the identifier.

Therefore, the terminal switches, in a simple manner, a video source corresponding to each subpicture in the multipicture, which can further solve a problem in the prior art that a manner of modifying a video source of a multipicture requires a complex operation and has poor usability.

In this embodiment, the multipicture is synthesized by the MCU of the video conferencing apparatus. The terminals A, B, C, and D do not perceive information of the multipicture, such as, an identifier of a subpicture and an arrangement position, in the multipicture, of the subpicture corresponding to the identifier. Further, when an operation (such as, double-clicking, sliding, dragging, or menu selection) is performed on a video picture on the terminal D, the terminal D needs to cooperate with the video conferencing apparatus to determine an operated object.

FIG. 4A is a schematic flowchart of a picture control method according to an embodiment of the present invention. As shown in FIG. 4A, the picture control method in this embodiment is described in the following steps.

401: When videos separately corresponding to more than one terminal in a video conference are separately displayed on a multipicture of a first terminal, the first terminal receives information that is of the multipicture and sent by a video conferencing apparatus, where the information of the multipicture includes: an identifier of a subpicture, an arrangement position, in the multipicture, of the subpicture corresponding to the identifier, a relative size of the subpicture corresponding to the identifier, and the like.

In another embodiment, the information of the multipicture may further include the number of subpictures, an identifier of a subpicture, an arrangement position, in the multipicture, of the subpicture corresponding to the identifier, a relative size of the subpicture corresponding to the identifier, a current video source of the subpicture corresponding to the identifier, and the like. The embodiment is merely used as an example.

402: The first terminal receives a first instruction that is used to replace a video source of at least one subpicture in the multipicture, where the first instruction includes relative position information of the at least one subpicture and indication information that is used to indicate a new video source of the at least one subpicture.

403: The first terminal determines a coordinate value range of each subpicture in the multipicture according to the arrangement position and the relative size, and determines, according to the relative position information, a coordinate value range, to which the relative position information belongs, of a subpicture corresponding to an identifier, to obtain an identifier of the at least one subpicture.

In another embodiment, if the information of the multipicture includes information of a current video source of a subpicture corresponding to an identifier, in step 403, the first terminal may further determine, according to the identifier of the subpicture, a video source corresponding to the subpicture.

404: The first terminal sends a request message including the identifier of the at least one subpicture and the indication information to the video conferencing apparatus, so that the video conferencing apparatus uses the new video source to replace a current video source of the at least one subpicture, where the at least one subpicture is the at least one subpicture corresponding to the relative position information.

Specifically, in an optional implementation process, the request message includes: the identifier of the at least one subpicture and the indication information. Accordingly, the video conferencing apparatus may use the new video source to replace a current video source of a subpicture corresponding to the identifier.

In another embodiment, the foregoing request message may further include: a video source corresponding to the identifier of the subpicture.

405: The first terminal receives a video stream that is corresponding to the new video source and sent by the video conferencing apparatus, and displays the new video source on a subpicture corresponding to the new video source.

In an exemplary embodiment, the first terminal may further receive an operation success response sent by the video conferencing apparatus.

The picture control method in this embodiment enables a terminal to switch, in a simple manner, a video source corresponding to each subpicture in a multipicture, which can further solve a problem in the prior art that a manner of modifying a video source of a multipicture requires a complex operation and has poor usability.

For example, for "the first terminal receives a first instruction that is used to replace a video source of at least one subpicture in the multipicture, where the first instruction includes: relative position information of the at least one subpicture and indication information that is used to indicate a new video source of the at least one subpicture" in step 301 or step 402, if the first instruction is a first instruction that is used to switch video sources of two subpictures in the multipicture, the first instruction may include the several types of possible information described below.

First, the first terminal receives the first instruction that is used to replace two video sources in the multipicture, where the first instruction includes relative position information of a first subpicture, and indication information used to indicate that a video source corresponding to the first subpicture is switched with a video source corresponding to a second subpicture, and the first instruction further includes an identifier of the second subpicture.

That is, the relative position information in the first instruction is the relative position information of the first subpicture, the indication information in the first instruction is the indication information used to indicate that the video source corresponding to the first subpicture is switched with the video source corresponding to the second subpicture, and the first instruction further includes the identifier of the second subpicture.

Second, the first terminal receives the first instruction that is used to replace two video sources in the multipicture, where the first instruction includes relative position information of a first subpicture, relative position information of a second subpicture, indication information that is used to indicate a new video source corresponding to the first subpicture, and indication information that is used to indicate a new video source corresponding to the second subpicture.

That is, the relative position information in the first instruction includes the relative position information of the first subpicture and the relative position information of the second subpicture, and the indication information includes: the indication information that is used to indicate the new video source corresponding to the first subpicture and the indication information that is used to indicate the new video source corresponding to the second subpicture.

Third, the first terminal receives the first instruction that is used to replace two video sources in the multipicture, where the first instruction includes relative position information of a first subpicture, relative position information of a second subpicture, and indication information that is used to indicate a new video source corresponding to the first subpicture and a new video source corresponding to the second subpicture.

That is, the relative position information in the first instruction includes the relative position information of the first subpicture and the relative position information of the second subpicture, and the indication information includes: the indication information that is used to indicate the new video source corresponding to the first subpicture and the new video source corresponding to the second subpicture.

Figure 4B:
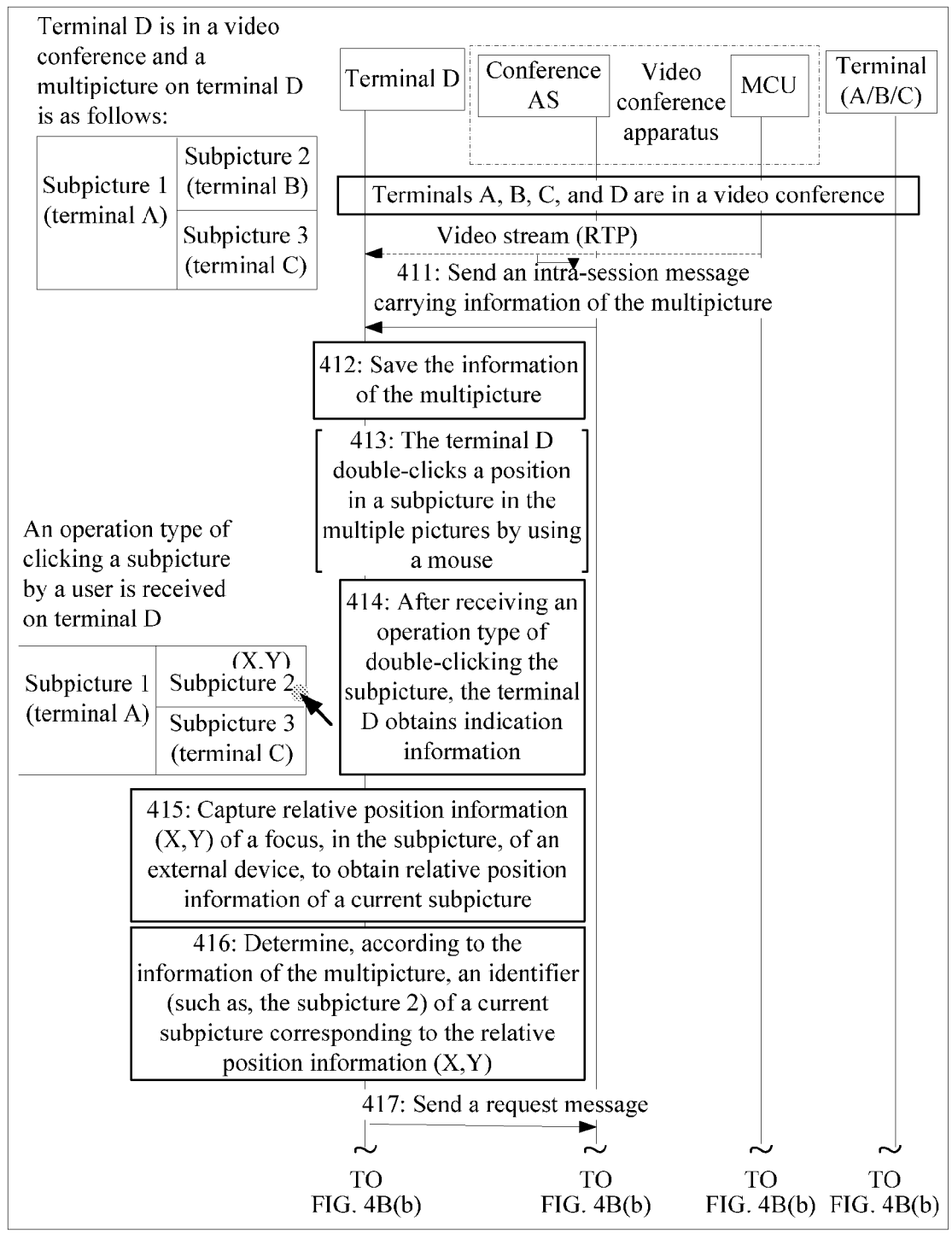
FIG. 4B(a) and FIG. 4B(b) are a schematic flowchart of a picture control method according to an embodiment of the present invention.
Figure 4B:
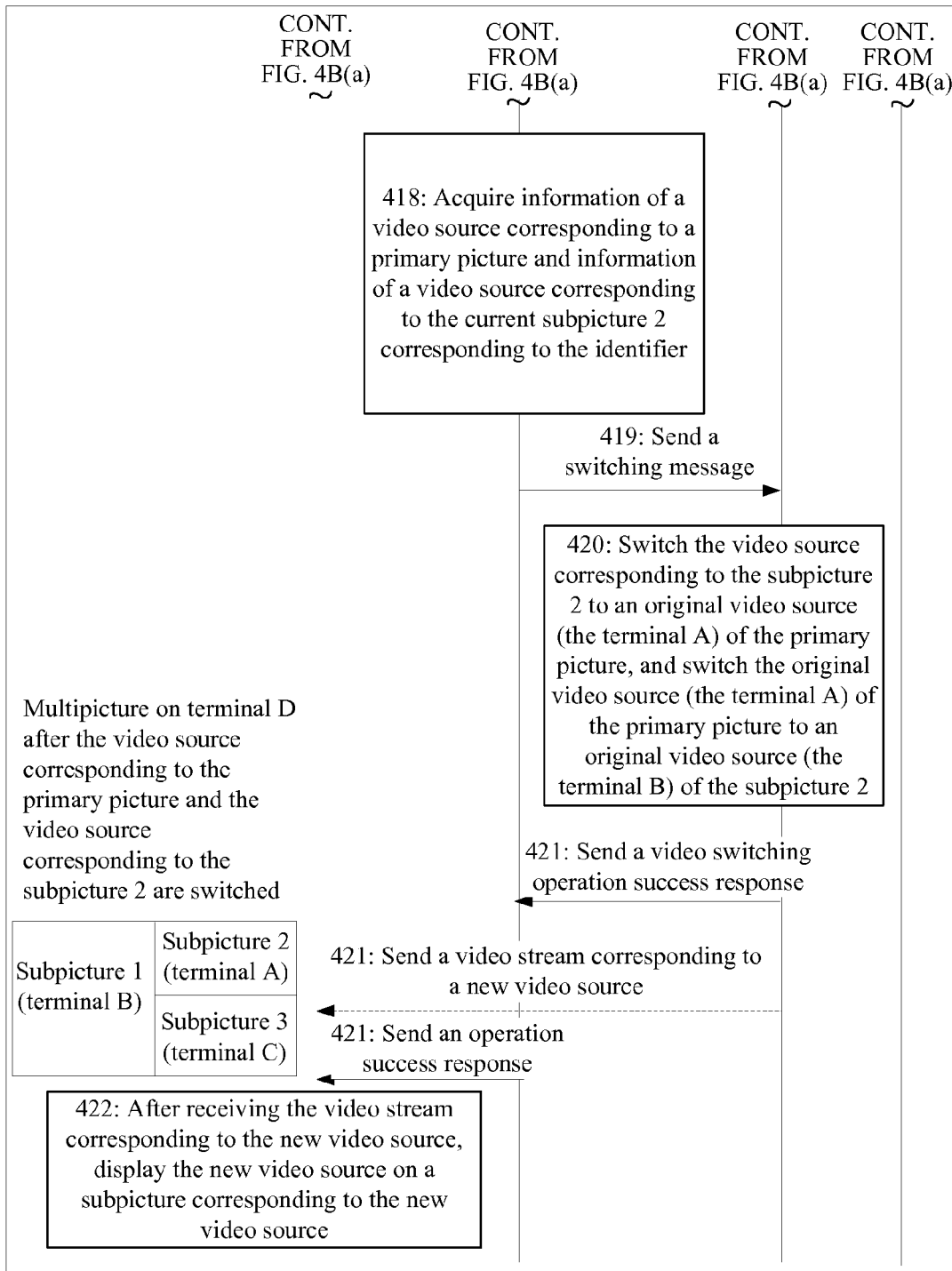

FIG. 4B(a) and FIG. 4B(b) are a schematic flowchart of a picture control method according to an embodiment of the present invention. As shown in FIG. 4B, the picture control method in this embodiment is described as follows:

Terminals A, B, C, and D are in a video conference. The terminal D watches, on a terminal side, videos of the terminals A, B, and C, where a video corresponding to the terminal A is a primary picture, and videos separately corresponding to the terminals B and C are secondary pictures.

411: A conference AS of a video conferencing apparatus sends an intra-session message to the terminal D, where the intra-session message carries information of a multipicture, where the information of the multipicture includes an identifier of a subpicture, an arrangement position, in the multipicture, of the subpicture corresponding to the identifier, a relative size of the subpicture corresponding to the identifier, and the like.

It may be understood that, when the information of the multipicture changes, for example, a subpicture 3 is changed to a subpicture 4, the conference AS may resend the foregoing intra-session message including the information of the multipicture to the terminal.

412: The terminal D saves the foregoing received information of the multipicture.

413: The terminal D double-clicks a position in a subpicture of the multipicture by using a mouse.

414: The terminal D receives information, which is transmitted by a user interface, of an operation type of double-clicking a subpicture by an external device corresponding to the multipicture, and further obtains indication information, where the indication information includes: indication information indicating that a video source corresponding to a current subpicture is switched with a video source corresponding to a primary picture (a subpicture 1) in the picture layout.

415: After obtaining the foregoing indication information, the terminal D captures relative position information (X, Y) of a focus (such as, a point where the mouse is located) that is corresponding to the external device and in the subpicture of the multipicture, to obtain relative position information of the current subpicture.

That is, after the terminal D captures the double-clicking operation type of the external device, the focus corresponding to the external device is located in the relative position information (X, Y) in a video window of the multipicture.

In this embodiment, the double-clicking operation type indicates that the terminal D needs to switch a video source played in the subpicture to the primary picture for playing and the video source corresponding to the primary picture to the current subpicture for playing.

416: After triggering a first instruction, a first terminal determines an identifier, such as, a subpicture 2, of the subpicture according to the information of the multipicture and the relative position information (X, Y) of the focus (for example, the point where the mouse is located) that is corresponding to the external device, in the subpicture of the multipicture, and captured in step 415.

417: The terminal D sends a request message, such as, SIP INFO, to the conference AS of the video conferencing apparatus, where the request message carries the indication information in the foregoing step 414 and the identifier, such as, the subpicture 2, of the subpicture in step 416.

In another embodiment, the request message herein may also be a request message carried by User Datagram Protocol ("UDP"), Transmission Control Protocol ("TCP"), Hypertext Transfer Protocol ("HTTP"), Simple Object Access Protocol ("SOAP"), or the like.

418: After receiving the request message, the conference AS acquires information of the video source corresponding to a current primary picture and acquires information of the video source corresponding to the current subpicture 2.

In an optional implementation manner, in the foregoing step 416, the first terminal may determine, according to the saved information of the multipicture, a video source corresponding to the identifier of the subpicture and information of the video source corresponding to the primary picture. Further, in step 417, the request message may include: content of the video source corresponding to the identifier of the subpicture, the information of the video source corresponding to the primary picture, and the like. Further, in step 418, the conference AS no longer acquires the information of the video source after receiving a second request message.

419: The conference AS sends a switching message to an MCU, where the switching message is used to instruct the MCU to switch the video source of the primary picture currently watched by the terminal D to the video source played by the subpicture 2 and switch the video source of the subpicture 2 to the video source played in the primary picture.

420: After receiving the switching message, the MCU switches the video source corresponding to the subpicture 2 to an original video source (the terminal A) of the primary picture and switches the original video source (the terminal A) of the primary picture to an original video source (the terminal B) of the subpicture 2, returns a video switching operation success response of the switching message to the conference AS, and sends a video stream corresponding to the new video source to the terminal D.

421: After receiving the video switching operation success response, the conference AS returns an operation success response to the terminal D.

422: The terminal D receives the operation success response sent by the conference AS, and receives the video stream corresponding to the new video source and displays the new video source on a subpicture corresponding to the new video source (as shown in FIG. 4B, a multipicture after the video source switching is displayed, a video of the watched primary picture is a user B, a video of the subpicture 2 is a user A).

In this embodiment, when the multipicture is used, the conference AS may send information of the multipicture to the terminal D, and the terminal locally saves the information of the multipicture. When an external device double-clicks (or drags, selects through a menu, or the like) a video picture on the terminal D, the terminal determines an operation type, captures relative position information (X, Y) of a double-clicking focus, in a video window, of the external device, calculates an operated object (for example, a subpicture 2) according to the relative position information and the saved information of the multipicture, and then sends, to the conference AS, a request message carrying the operation type and the operated object. The conference AS may acquire a current video source of the operated object and then send a switching message to an MCU, so as to use a new video source to replace a video source of a subpicture corresponding to the identifier.

Therefore, the foregoing method allows a terminal to directly perform a simple operation (for example, clicking, dragging, and menu selection by using a mouse or touch panel) in a video window of a multipicture to implement video source switching of a subpicture. This enables the terminal to switch, in a simple manner, a video source corresponding to each subpicture in the multipicture, which can further solve a problem in the prior art that a manner of modifying video sources of a multipicture requires a complex operation, is prone to misoperation, and has poor usability.

FIG. 5 is a schematic flowchart of a picture control method according to an embodiment of the present invention. As shown in FIG. 5, the picture control method in this embodiment is described as follows:

501: A video conferencing apparatus receives a request message that includes a first instruction and is sent by a first terminal, where when videos separately corresponding to more than one terminal in a video conference are separately displayed on a multipicture of the first terminal, the request message is sent after the first terminal receives the first instruction that is used to replace a video source of at least one subpicture in the multipicture, and the first instruction includes relative position information of the at least one subpicture and indication information that is used to indicate a new video source of the at least one subpicture.

502: The video conferencing apparatus uses the new video source to replace a current video source of the at least one subpicture, where the at least one subpicture is the at least one subpicture corresponding to the relative position information.

503: The video conferencing apparatus sends a video stream corresponding to the new video source to the first terminal, so that the first terminal displays the new video source on a subpicture corresponding to the new video source.

For example, in one optional implementation scenario, the foregoing step 502 may specifically include the following steps. When the request message includes: the relative position information of the at least one subpicture and the indication information, the video conferencing apparatus determines an identifier of the at least one subpicture according to the relative position information of the at least one subpicture, and uses the new video source indicated in the indication information to replace a current video source of a subpicture corresponding to the identifier.

In another optional implementation scenario, before step 501, the foregoing picture control method further includes the following step 500 that is not shown in the figure.

500: The video conferencing apparatus sends information of the multipicture to the first terminal, where the information of the multipicture includes an identifier of a subpicture, an arrangement position, in the multipicture, of the subpicture corresponding to the identifier, and a relative size of the subpicture corresponding to the identifier.

Accordingly, the foregoing step 502 may specifically be, when the request message includes: an identifier of the at least one subpicture and the indication information, the video conferencing apparatus uses the new video source indicated in the indication information to replace a current video source of a subpicture corresponding to the identifier, where the identifier of the at least one subpicture is an identifier, determined by the first terminal according to the received information of the multipicture and the relative position information of the at least one subpicture, of the at least one subpicture.

Certainly, in another embodiment, the foregoing information of the multipicture may include the number of subpictures, an identifier of a subpicture, an arrangement position, in the multipicture, of the subpicture corresponding to the identifier, a relative size of the subpicture corresponding to the identifier, a current video source of the subpicture corresponding to the identifier, and the like.

The picture control method in this embodiment enables a terminal to switch, in a simple manner, a video source corresponding to each subpicture in a multipicture, which can further solve a problem in the prior art that a manner of modifying a video source of a multipicture requires a complex operation and has poor usability.

According to another aspect of the present invention, the present invention further provides a terminal. As shown in FIG. 6, the terminal is in a video conference, and a multipicture on the terminal displays videos separately corresponding to more than one terminal in the video conference. The terminal in this embodiment includes a receiving unit 61 and a sending unit 62.

The receiving unit 61 is configured to receive a first instruction that is used to replace a video source of at least one subpicture in the multipicture, where the first instruction includes relative position information of the at least one subpicture and indication information that is used to indicate a new video source of the at least one subpicture. The sending unit 62 is configured to, after the receiving unit 61 receives the first instruction, send a request message including the first instruction to a video conferencing apparatus, so that the video conferencing apparatus uses the new video source to replace a current video source of the at least one subpicture, where the at least one subpicture is the at least one subpicture corresponding to the relative position information.

The receiving unit 61 is further configured to, after the sending unit 62 sends the request message, receive a video stream that is corresponding to the new video source and sent by the video conferencing apparatus, and display the new video source on a subpicture corresponding to the new video source.

In an application scenario, the foregoing sending unit 62 may be specifically configured to, after the receiving unit 61 receives the first instruction, send the request message including the first instruction to the video conferencing apparatus, so that the video conferencing apparatus determines an identifier of the at least one subpicture according to pre-stored information of the multipicture on the first terminal and the relative position information of the at least one subpicture, and uses the new video source to replace a current video source of a subpicture corresponding to the identifier.

In another application scenario, the receiving unit 61 is further configured to, before receiving the first instruction, receive information that is of the multipicture and sent by the video conferencing apparatus, where the information of the multipicture includes: identifiers of all subpictures in the multipicture, arrangement positions, in the multipicture, of the subpictures corresponding to the identifiers, and relative sizes of the subpictures corresponding to the identifiers. In this case, the terminal may further include a determining unit 63 that is not shown in the figure. The determining unit 63 is configured to, after the receiving unit 61 receives the first instruction, determine a coordinate value range of each subpicture in the multipicture according to the arrangement positions and the relative sizes; and determine, according to the relative position information, a coordinate value range, to which the relative position information belongs, of a subpicture corresponding to an identifier, to obtain the identifier of the at least one subpicture.

Accordingly, the sending unit 62 is specifically configured to, after the determining unit 63 obtains the identifier of the at least one subpicture, send the request message including the first instruction to the video conferencing apparatus, where the request message includes: the identifier of the at least one subpicture and the indication information, so that the video conferencing apparatus uses the new video source to replace a current video of a subpicture corresponding to the identifier.

The foregoing terminal switches, in a simple manner, a video source corresponding to each subpicture in a multipicture, which can solve a problem in the prior art that a manner of modifying a video source of a multipicture requires a complex operation and has poor usability.

Figure 7:
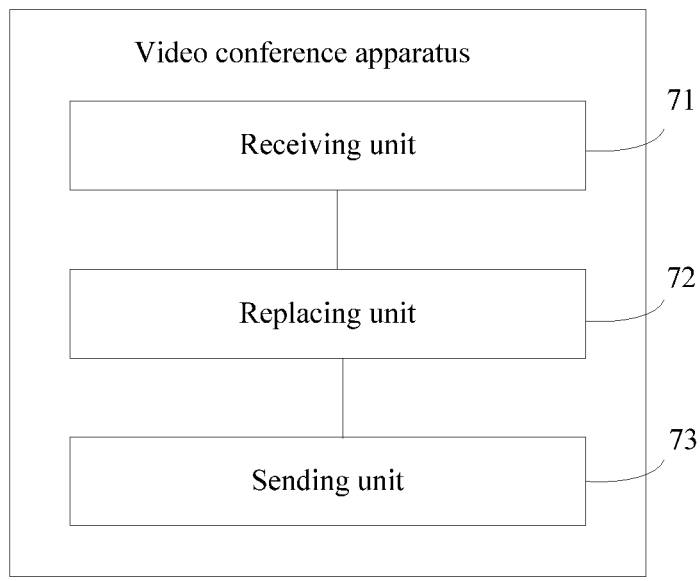
FIG. 7 is a schematic structural diagram of a video conferencing apparatus according to an embodiment of the present invention.

According to another aspect of the present invention, the present invention further provides a video conferencing apparatus. As shown in FIG. 7, the video conferencing apparatus in this embodiment includes: a receiving unit 71, a replacing unit 72, and a sending unit 73.

The receiving unit 71 is configured to receive a request message that includes a first instruction and is sent by a first terminal, where when videos separately corresponding to more than one terminal in a video conference are separately displayed on a multipicture of the first terminal, the request message is sent after the first terminal receives the first instruction that is used to replace a video source of at least one subpicture in the multipicture, and the first instruction includes: relative position information of the at least one subpicture and indication information that is used to indicate a new video source of the at least one subpicture.

The replacing unit 72 is configured to, after the receiving unit 71 receives the request message, use the new video source to replace a current video source of the at least one subpicture, where the at least one subpicture is the at least one subpicture corresponding to the relative position information.

The sending unit 73 is configured to, after the replacing unit 72 uses the new video source for replacement, send a video stream corresponding to the new video source to the first terminal, so that the first terminal displays the new video source on a subpicture corresponding to the new video source.

In an optional implementation manner, the foregoing sending unit 73 is further configured to: before the receiving unit 71 receives the request message, send information of the multipicture to the first terminal, where the information of the multipicture includes: identifiers of all subpictures in the multipicture, arrangement positions, in the multipicture, of the subpictures corresponding to the identifiers, and relative sizes of the subpictures corresponding to the identifiers.

Accordingly, the replacing unit 72 is specifically configured to, after the receiving unit 71 receives the request message, where the request message includes the indication information, and an identifier, which is determined by the first terminal according to the received information of the multipicture and the relative position information of the at least one subpicture, of the at least one subpicture, use the new video source indicated in the indication information to replace a current video resource of a subpicture corresponding to the identifier.

By cooperating with a terminal, the foregoing video conferencing apparatus may enable the terminal to switch, in a simple manner, a video source corresponding to each subpicture in a multipicture, which further solves a problem in the prior art that a manner of modifying a video source of a multipicture requires a complex operation and has poor usability.

It should be noted that, in the foregoing embodiments of the terminal and video conferencing apparatus, division of functional units is just used as an example, and in an actual application, according to a need, for example, a configuration requirement of corresponding hardware or a consideration for convenience of software implementation, the foregoing functions may be allocated to and completed by different functional units, that is, an internal structure of the terminal is divided into different functional units to complete the foregoing described all or partial functions. Moreover, in an actual application, the corresponding functional units in this embodiment may be implemented by corresponding hardware, or may be completed by executing corresponding software by corresponding hardware. For example, the aforementioned sending unit may be hardware that performs a function of the aforementioned sending unit, such as a transmitter, or may be a general processor or another hardware device that can execute a corresponding computer program to complete the aforementioned function. For another example, the aforementioned receiving unit may be hardware that implements a function of the aforementioned receiving unit, such as a receiver, or may be a general processor or another hardware device that can execute a corresponding computer program to complete the aforementioned function. (The embodiments provided in the specification may use the foregoing description principle.)

Figure 8:
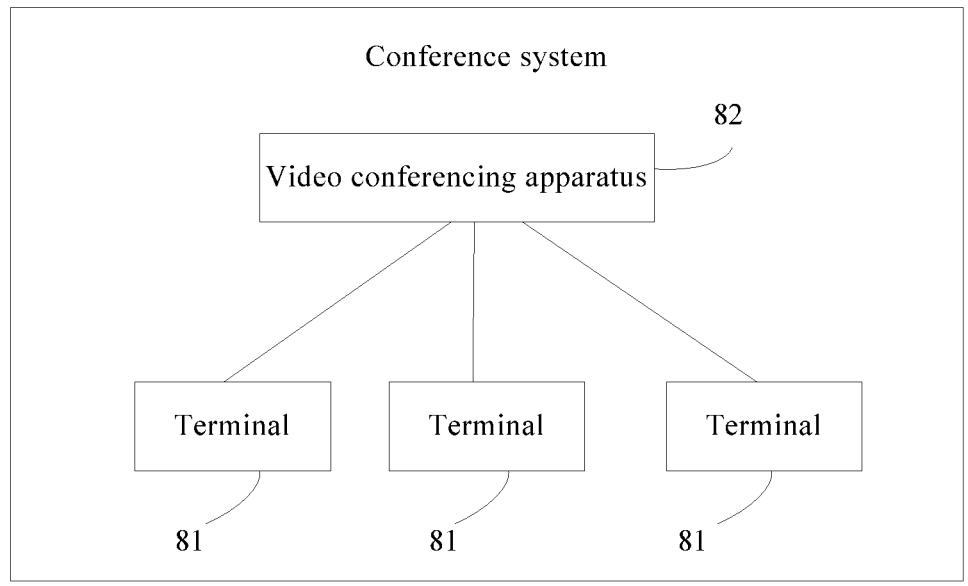
FIG. 8 is a schematic structural diagram of a conference system according to an embodiment of the present invention.

According to another aspect of the present invention, the present invention further provides a conference system. As shown in FIG. 8, the conference system includes a terminal 81 and a video conferencing apparatus 82.

When videos separately corresponding to more than one terminal in a video conference are separately displayed on a multipicture of the terminal 81, the terminal 81 receives a first instruction that is used to replace a video source of at least one subpicture in the multipicture, where the first instruction includes relative position information of the at least one subpicture and indication information that is used to indicate a new video source of the at least one subpicture.

The terminal 81 sends a request message including the first instruction to the video conferencing apparatus 82.

After receiving the request message, the video conferencing apparatus 82 uses the new video source to replace a current video source of the at least one subpicture, where the at least one subpicture is the at least one subpicture corresponding to the relative position information, and sends a video stream corresponding to the new video source to the terminal.

After receiving the video stream that is corresponding to the new video source and sent by the video conferencing apparatus 82, the terminal 81 displays the new video source on a subpicture corresponding to the new video source.

In an optional implementation scenario, that after receiving the request message, the video conferencing apparatus 82 uses the new video source to replace a current video source of the at least one subpicture, where the at least one subpicture is the at least one subpicture corresponding to the relative position information, specifically includes the following steps. After receiving the request message, the video conferencing apparatus 82 determines an identifier of the at least one subpicture according to pre-stored information of multipicture on the terminal 81 and the relative position information of the at least one subpicture, and uses the new video source to replace a current video source of a subpicture corresponding to the identifier.

In another optional implementation scenario, before receiving the first instruction, the terminal 81 receives information that is of the multipicture and sent by the video conferencing apparatus 82, where the information of the multipicture includes identifiers of all subpictures in the multipicture, arrangement positions, in the multipicture, of the subpictures corresponding to the identifiers, and relative sizes of the subpictures corresponding to the identifiers.

Accordingly, after receiving the first instruction, the terminal determines a coordinate value range of each subpicture in the multipicture according to the arrangement positions and the relative sizes, and determines, according to the relative position information, a coordinate value range, to which the relative position information belongs, of a subpicture corresponding to an identifier, to obtain an identifier of the at least one subpicture.

Accordingly, the request message includes: the identifier of the at least one subpicture and the indication information.

That the video conferencing apparatus uses the new video source to replace a current video source of the at least one subpicture is specifically as follows: the video conferencing apparatus uses the new video source to replace a current video source of a subpicture corresponding to the identifier.

Interaction between a video conferencing apparatus and a terminal in the foregoing conference system may enable the terminal to switch, in a simple manner, a video source corresponding to each subpicture in a multipicture, which further solves a problem in the prior art that a manner of modifying a video source of a multipicture requires a complex operation and has poor usability.

According to another aspect of the present invention, the present invention further provides a terminal. The terminal may be a computer, a PDA, a smartphone, or the like.

Figure 9:
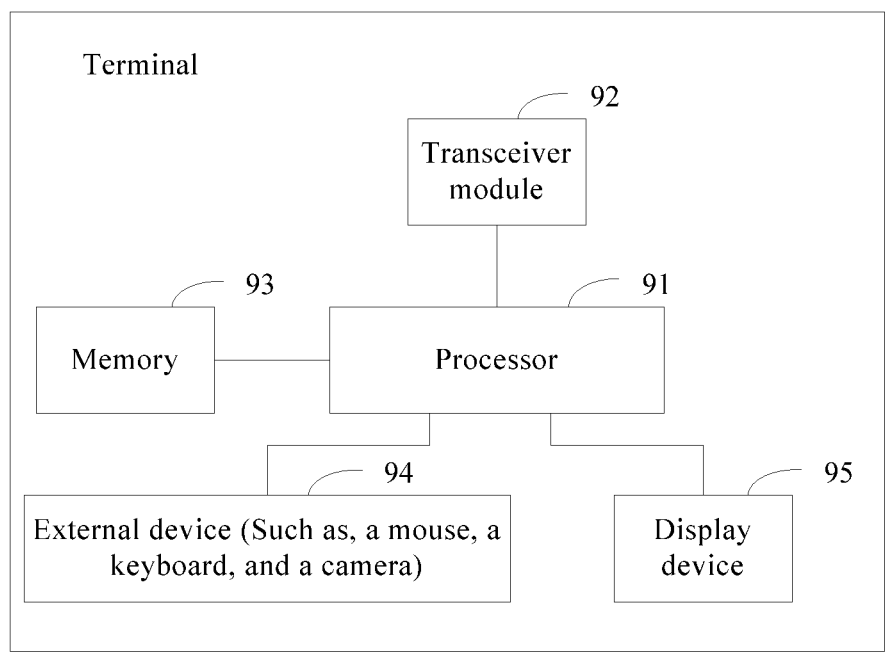
FIG. 9 is a schematic structural diagram of a terminal according to another embodiment of the present invention.

As shown in FIG. 9, the terminal in this embodiment may include a processor 91, a transceiver module 92, a memory 93, an external device 94, and a displaying device 95, where the external device 94 may include devices such as a mouse, a camera, and a keyboard.

Specifically, the foregoing processor 91 is coupled with the transceiver module 92, the memory 93, and the displaying device 95, and is connected to the external device 94 by using a user interface.

The processor 91 of the terminal is a control center of the terminal, is connected to all parts of the entire terminal by using various interfaces and lines, and executes various functions of the terminal and data processing by running or executing a software program and/or a module stored in the memory 93 and calling data stored in the memory 93, so as to perform overall monitoring on the terminal.

Optionally, the processor 91 may include one or more processing units. Exemplarily, the processor 91 may be integrated with an application processor and a modem processor, where the application processor mainly processes an operating system, a user interface, an application program, and the like, and the modem processor mainly processes wireless communication. It may be understood that the foregoing modem processor may not be integrated with the processor 91.

The transceiver module 92 may be configured to receive and send information, or receive and send a signal in a conversation process.

The memory 93 may be configured to store a software program and a module. The processor 91 executes various function applications of the terminal and data processing by running the software program and module stored in the memory 93. The memory 93 may mainly include a program storage area and a data storage area, where the program storage area may store the operating system, an application program required by at least one function (such as, a voice playing function and an image playing function), and the like, and the data storage area may store data (for example, audio data) created according to use of the terminal, and the like. In addition, the memory 93 may include a high-speed random access memory, or may also include a non-volatile memory, for example, at least one disk storage device, a flash memory device, or another non-volatile solid-state storage device.

Particularly, the memory 93 stores information of a program routine executed by the processor 91, so that the processor is configured to control execution of the program routine, such as implementation of the foregoing picture control method.

The external device 94 may be configured to receive entered numeral or character information, and generate a key signal input related to a user setting and function control of the terminal. Specifically, the external device 94 may include a touch panel, a mouse, a keyboard, a camera, and the like.

The displaying device 95 may be configured to display information entered by a user or information provided for a user, and a multipicture of a video stream sent by a video conferencing apparatus. The displaying device 95 may include a display panel. Optionally, the display panel may be configured by using a liquid crystal display ("LCD"), an organic light-emitting diode ("OLED") form.

Persons of ordinary skill in the art may understand that, all or some of the steps in each of the foregoing method embodiments may be implemented by program instruction relevant hardware. The aforementioned program may be stored in a computer readable storage medium. When the program runs, the steps of the foregoing method embodiments are performed. The aforementioned storage medium includes any medium capable of storing program code, such as a ROM, a RAM, a magnetic disk, or an optical disc.

Another embodiment of the present invention provides another terminal, where videos separately corresponding to more than one terminal in a video conference are separately displayed on a multipicture of the terminal. The terminal includes a receiving unit 1001, configured to receive a first instruction that is used to replace a video source of at least one subpicture in the multipicture, where the first instruction includes relative position information of the at least one subpicture and indication information that is used to indicate a new video source of the at least one subpicture, where the new video source is preconfigured; and a sending unit 1003, configured to, after the receiving unit receives the first instruction, send a request message including an identifier of the at least one subpicture and the indication information to a video conferencing apparatus, so that the video conferencing apparatus uses the new video source to replace a current video source of the at least one subpicture, where the at least one subpicture is a subpicture corresponding to the identifier of the at least one subpicture, where the receiving unit 1001 is further configured to: after the sending unit 1003 sends the request message, receive a video stream that is corresponding to the new video source and sent by the video conferencing apparatus, and display the new video source on a subpicture corresponding to the new video source.

Optionally, the receiving unit 1001 is further configured to, before receiving the first instruction, receive information that is of the multipicture and sent by the video conferencing apparatus, where the information of the multipicture includes: identifiers of all subpictures in the multipicture, arrangement positions, in the multipicture, of the subpictures corresponding to the identifiers, and relative sizes of the subpictures corresponding to the identifiers.

Optionally, the terminal further includes a determining unit 1005. The determining unit 1005 is configured to, after the receiving unit 1001 receives the first instruction, determine a coordinate value range of each subpicture in the multipicture according to the arrangement positions and the relative sizes, and determine, according to the relative position information, a coordinate value range, to which the relative position information belongs, of a subpicture corresponding to an identifier, to obtain the identifier of the at least one subpicture.

The sending unit 1003 is specifically configured to, after the determining unit 1005 obtains the identifier of the at least one subpicture, send the request message including the identifier of the at least one subpicture and the indication information to the video conferencing apparatus, so that the video conferencing apparatus uses the new video source to replace a current video source of a subpicture corresponding to the identifier.

Another embodiment of the present invention provides another video conferencing apparatus, including a receiving unit 1101, configured to receive a request message sent by a first terminal, where when videos separately corresponding to more than one terminal in a video conference are separately displayed on a multipicture of the first terminal, the request message is sent after the first terminal receives a first instruction that is used to replace a video source of at least one subpicture in the multipicture, and the request message includes an identifier of the at least one subpicture and indication information that is used to indicate a new video source of the at least one subpicture; a replacing unit 1103, configured to after the receiving unit receives the request message, use the new video source to replace a current video source of the at least one subpicture, where the at least one subpicture is the at least one subpicture corresponding to the identifier of the at least one subpicture, and a sending unit 1105, configured to, after the replacing unit 1103 uses the new video source for replacement, send a video stream corresponding to the new video source to the first terminal, so that the first terminal displays the new video source on a subpicture corresponding to the new video source.

Optionally, the sending unit 1105 is further configured to, before the receiving unit 1101 receives the request message, send information of the multipicture to the first terminal, where the information of the multipicture includes identifiers of all subpictures in the multipicture, arrangement positions, in the multipicture, of the subpictures corresponding to the identifiers, and relative sizes of the subpictures corresponding to the identifiers.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A picture control method for controlling a video multipicture display of a first terminal, wherein videos separately corresponding to more than one terminal in a video conference are separately displayed, the method comprising:
    receiving, by the first terminal, a first instruction that is used to replace a video source of a subpicture in the multipicture, wherein the first instruction comprises relative position information of the subpicture and indication information that is used to indicate a new video source of the subpicture;
    sending a request message comprising an identifier of the subpicture and the indication information to a video conferencing apparatus, so that the video conferencing apparatus uses the new video source to replace a current video source of the subpicture corresponding to the identifier;
    receiving a video stream corresponding to the new video source and sent by the video conferencing apparatus; and
    displaying the new video source on the subpicture corresponding to the new video source;
    wherein the identifier of the subpicture is the only subpicture identifier included in the request message sent to the video conferencing apparatus; and
    wherein the terminal is located remotely from the video conferencing apparatus, and wherein the terminal is connected to the video conferencing apparatus through a network.

2. The method according to claim 1, further comprising:
    receiving, by the first terminal, information that is of the multipicture and sent by the video conferencing apparatus, wherein the information of the multipicture comprises:
        identifiers of all subpictures in the multipicture;
        arrangement positions in the multipicture of the subpictures corresponding to the identifiers; and
        relative sizes of the subpictures corresponding to the identifiers.

3. The method according to claim 2, further comprising:
    determining, by the first terminal, a coordinate value range of each subpicture in the multipicture according to the arrangement positions and the relative sizes; and
    determining, according to the relative position information, the coordinate value range to which the relative position information belongs, to obtain the identifier of the subpicture.

4. The method according to claim 2, further comprising:
    receiving, by the first terminal, information that is of an operation type corresponding to the multipicture and transmitted by a user interface, wherein the operation type corresponding to the multipicture is preset in the first terminal;
    obtaining, by the first terminal, the indication information in the first instruction, in response to receiving the information that is of the operation type corresponding to the multipicture; and
    capturing, by the first terminal, in response to obtaining the indication information in the first instruction, relative position information of a focus that corresponds to an external device in the multipicture, wherein the relative position information of the focus is the relative position information of the subpicture.

5. The method according to claim 1, further comprising:
    receiving, by the first terminal, information that is of an operation type corresponding to the multipicture and transmitted by a user interface, wherein the operation type corresponding to the multipicture is preset in the first terminal;

obtaining, by the first terminal, the indication information in the first instruction, in response to receiving the information that is of the operation type corresponding to the multipicture; and capturing, by the first terminal, in response to obtaining the indication information in the first instruction, relative position information of a focus that corresponds to an external device in the multipicture, wherein the relative position information of the focus is the relative position information of the subpicture.

6. A terminal for separately displaying videos on a multipicture, the videos separately corresponding to more than one terminal in a video conference, the terminal comprising a processor and memory including program codes that, when executed by the processor, cause the terminal to:

receive a first instruction that is used to replace a video source of a subpicture in the multipicture, wherein the first instruction comprises relative position information of the subpicture and indication information that is used to indicate a new video source of the subpicture;

send, in response to receiving the first instruction, a request message comprising an identifier of the subpicture and the indication information to a video conferencing apparatus, wherein the video conferencing apparatus uses the new video source to replace a current video source of the subpicture corresponding to the identifier;

receive a video stream that corresponding to the new video source and sent by the video conferencing apparatus; and display the new video source on the subpicture corresponding to the new video source;

wherein the identifier of the subpicture is the only subpicture identifier included in the request message sent to the video conferencing apparatus; and wherein the terminal is located remotely from the video conferencing apparatus, and wherein the terminal is connected to the video conferencing apparatus through a network.

7. The terminal according to claim 6, wherein the memory further includes program codes that, when executed by the processor, cause the terminal to:

receive information that is of the multipicture and sent by the video conferencing apparatus, wherein the information of the multipicture comprises:
  identifiers of all subpictures in the multipicture;
  arrangement positions in the multipicture of the subpictures corresponding to the identifiers; and
  relative sizes of the subpictures corresponding to the identifiers.

8. The terminal according to claim 7, wherein the memory further includes program codes that, when executed by the processor, cause the terminal to:

determine a coordinate value range of each subpicture in the multipicture according to the arrangement positions and the relative sizes; and determine, according to the relative position information, a coordinate value range, to which the relative position information belongs, to obtain the identifier of the subpicture.

9. The terminal according to claim 6, wherein the memory further includes program codes that, when executed by the processor, cause the terminal to:

receive, by the terminal, information that is of an operation type corresponding to the multipicture and transmitted by a user interface, wherein the operation type corresponding to the multipicture is preset in the terminal;

obtain, by the terminal, the indication information in the first instruction, in response to receiving the information that is of the operation type corresponding to the multipicture; and capture, by the terminal, in response to obtaining the indication information in the first instruction, relative position information of a focus that corresponds to an external device in the multipicture, wherein the relative position information of the focus is the relative position information of the subpicture.

10. A video conferencing apparatus, comprising a processor and memory including program codes that, when executed by the processor, cause the video conferencing apparatus to:

receive a request message sent by a first terminal, wherein videos separately corresponding to more than one terminal in a video conference are separately displayed on a multipicture of the first terminal, and wherein the request message is sent in response to the first terminal receiving a first instruction that is used to replace a video source of a subpicture in the multipicture, and the request message comprises an identifier of the subpicture and indication information that is used to indicate a new video source of the subpicture;

replace, in response to receiving the request message, a current video source of the subpicture with the new video source, wherein the subpicture corresponds to the identifier; and send a video stream corresponding to the new video source to the first terminal, so that the first terminal displays the new video source on the subpicture corresponding to the new video source;

wherein the identifier of the subpicture is the only subpicture identifier included in the request message sent to the video conferencing apparatus; and wherein the terminal is located remotely from the video conferencing apparatus, and wherein the terminal is connected to the video conferencing apparatus through a network.

11. The video conferencing apparatus according to claim 10, wherein the memory further includes program codes that, when executed by the processor, cause the video conferencing apparatus to:

send information about the multipicture to the first terminal, wherein the information about the multipicture comprises:
  identifiers of all subpictures in the multipicture;
  arrangement positions in the multipicture of the subpictures corresponding to the identifiers; and
  relative sizes of the subpictures corresponding to the identifiers.

12. The video conferencing apparatus according to claim 10, wherein the new video source is preconfigured on the video conferencing apparatus.

13. The video conferencing apparatus according to claim 10, wherein replacing the current video source of the identified subpicture with the new video source comprises switching a video source corresponding to the identified subpicture to correspond to a primary subpicture of the multipicture and switching a video source corresponding to the primary subpicture of the multipicture to correspond to the identified subpicture.

14. A non-transitory computer readable storage medium encoded with a computer program stored thereon for:
- receiving a first instruction that is used to replace a video source of a subpicture in a multipicture of a first terminal, wherein videos separately corresponding to more than one terminal in a video conference are separately displayed on the multipicture, and wherein the first instruction comprises relative position information of the subpicture and indication information that is used to indicate a new video source of the subpicture;
- sending, in response to receiving the first instruction, a request message comprising an identifier of the subpicture and the indication information to a video conferencing apparatus, wherein the video conferencing apparatus uses the new video source to replace a current video source of the subpicture, wherein the subpicture corresponds to the identifier;
- receiving a video stream corresponding to the new video source that is sent by the video conferencing apparatus; and
- displaying the new video source on the subpicture corresponding to the new video source;
- wherein the identifier of the subpicture is the only subpicture identifier included in the request message sent to the video conferencing apparatus; and
- wherein the terminal is located remotely from the video conferencing apparatus, and wherein the terminal is connected to the video conferencing apparatus through a network.

15. The non-transitory computer readable storage medium according to claim 14, further comprising:
- receiving information of the multipicture sent by the video conferencing apparatus, wherein the information of the multipicture comprises:
  - identifiers of all subpictures in the multipicture;
  - arrangement positions in the multipicture of the subpictures corresponding to the identifiers; and
  - relative sizes of the subpictures corresponding to the identifiers.

16. The non-transitory computer readable storage medium according to claim 15, further comprising:
- determining a coordinate value range of each subpicture in the multipicture according to the arrangement positions and the relative sizes; and
- determining, according to the relative position information, a coordinate value range, to which the relative position information belongs, to obtain the identifier of the subpicture.

17. The non-transitory computer readable storage medium according to claim 14, further comprising:
- obtaining, by the first terminal, the indication information in the first instruction, in response to receiving the information that is of an operation type corresponding to the multipicture; and
- capturing, by the first terminal, in response to obtaining the indication information in the first instruction, relative position information of a focus that corresponds to an external device in the multipicture, wherein the relative position information of the focus is the relative position information of the subpicture.

* * * * *